Sept. 3, 1957 W. F. PETERS 2,804,992
BOWL FEEDING GRAVIMETRIC FEEDER
Filed July 15, 1954 3 Sheets-Sheet 1

INVENTOR.
WILLIAM F. PETERS
BY
HIS ATTORNEY

INVENTOR.
WILLIAM F. PETERS
BY
HIS ATTORNEY

INVENTOR.
WILLIAM F. PETERS
BY William D. Carothers
HIS ATTORNEY

United States Patent Office 2,804,992
Patented Sept. 3, 1957

2,804,992

BOWL FEEDING GRAVIMETRIC FEEDER

William F. Peters, Indiana, Pa., assignor to Syntron Company, Homer City, Pa., a corporation of Delaware Application July 15, 1954, Serial No. 443,513

11 Claims. (Cl. 222—55)

This invention relates generally to gravimetric feeders and more particularly to the uniformity of flow of gravimetric feeders by the use of a bowl feeder supplying a constant speed weigh feeder for accurately weighing or proportioning of bulk material continuously.

The problem of supplying an accurate quantity of bulk material continuously has been attained to some degree of success by the use of a gravimetric feeder that employs a constant speed conveyor supported on a weighing device fed by a straight vibratory feeder conveyor the operation of which is controlled by the load on the constant speed conveyor. Any variation in this load is effective in changing the speed and thus the supply of the material is varied to maintain a substantially constant weight on the constant speed conveyor. It is necessary to provide a hopper and a vibrator that will supply a substantially constant source of material to the straight feeder. This may be controlled by opening and closing the mouth of the hopper.

The difficulty in solving this problem lies in the variation in the supply by the hopper and the straight vibratory feeder. The quantity may average out fairly close to the total weight desired but the consistency of the weight at any one instant is not as accurate as is desired.

This gravimetric feeder problem is found to be overcome by using a bowl feeder to supply the constant speed conveyor. The bowl feeder can be made to supply a substantially constant flow of material by causing a greater amount of material to be fed along the bowl track and at some position before discharge the track is restricted to allow only a predetermined volume from passing this restriction while the excess is continuously returned to the bowl. The amount delivered by the bowl may be varied by increasing or decreasing its flow through a control on the weighing device. However, the volume flow of material is maintained substantially constant and thus the weight is substantially uniform and very little regulation of this control is necessary.

The use of a feeder bowl with an inclined track along its inner wall for feeding bulk material has many advantages. Any excess material on the track will spill back into the bowl and be required to be again conveyed up the track. The manner of correcting the quantity delivered conserves the material by returning the excess to the bowl.

The mode of determining the volume of bulk material permitted to pass the accurate measuring of the track may be controlled in different ways. If the track is merely made narrower by cutting a section away and allowing more material to be continuously fed to this section than can pass this restriction, then the excess is bound to spill back leaving a constant amount.

Every material will have its own angle of repose when conveyed by a vibratory force. This angle would be lower or flatter than the natural angle of repose of the material due to its movement under the influence of the vibrations.

Another way to restrict the feeder bowl delivery track is to provide an abutment that is secured to the bowl and extends over a portion of the track thus making it smaller and that restriction would be piled as high with material as its vibratory angle of inclination would allow. Thus the volume passing this restriction would remain constant.

To insure a full restricted track section measured to the maximum amount of material that this reduced section can hold, a section of track immediately preceding may be made in the form of a deep trough shaped to crowd more volume in the smaller space of the reduced section and then let the excess spill out over into the bowl.

Another object and advantage of employing a feeder bowl in this manner is its use with a hopper. The feeder bowl may have a conical bottom and the hopper opening is mounted over this bottom in predetermined spaced relation. The spacing determined by this mounting may be varied by changing the elevation of the hopper or the bowl or by providing annular collar valve on the hopper spout which is adjustable relative to the bowl floor and functions as a valve. The collar may be flexibly connected to the hopper or merely a loose adjustable collar on the hopper spout.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
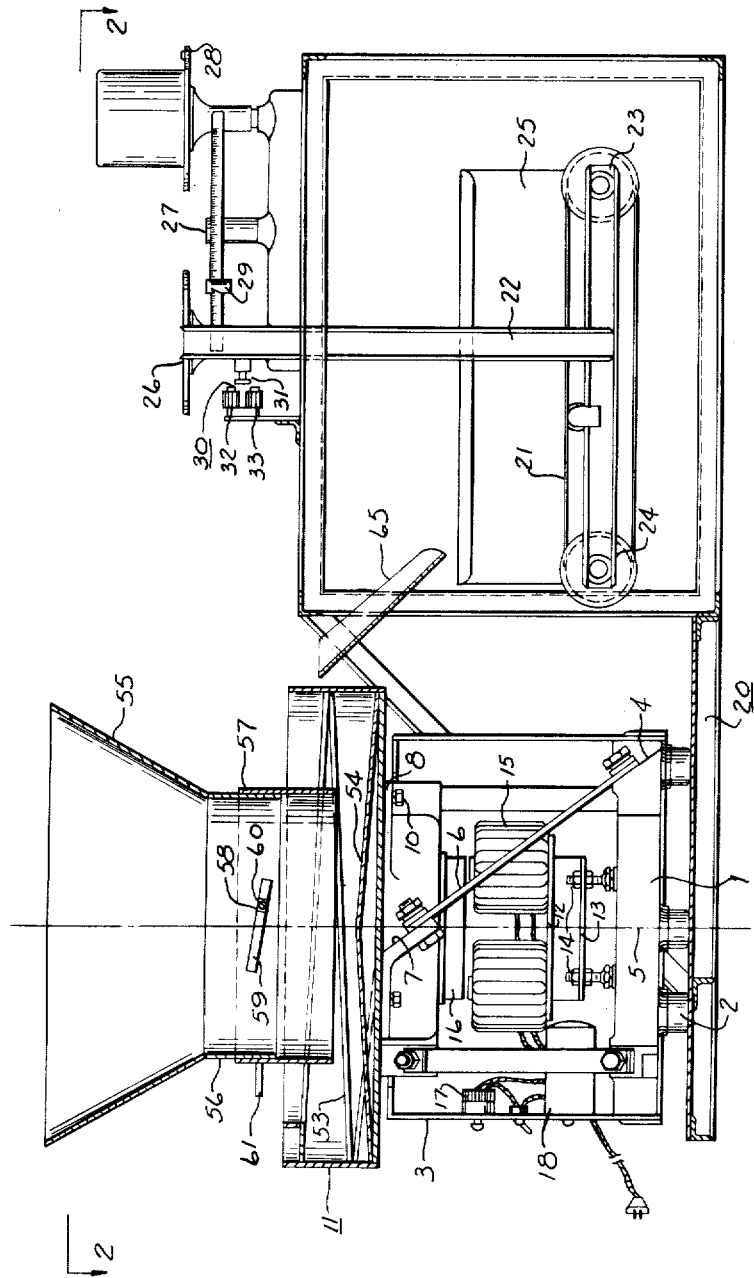
Fig. 1 is a view in vertical section of a gravimetric feeder comprising this invention.

Referring to the drawings, the reciprocating vibratory motor comprises the massive base 1 which is preferably a casting supported by the resilient feet 2 and carries the outer casing 3 that encloses the motor and the control parts therefor.

The base 1 is provided with a plurality of sloping seats 4 uniformly disposed about the vertical central axis indicated by the construction line 5. As shown these seats support the lower ends of the tuned spring means such as inclined resilient means or the leaf spring means 6. The upper ends of these leaf springs are secured to corresponding seats 7 formed on the frame 8. This frame member is provided with openings to receive the mounting bolts 10 for securing the unitary bowl 11 to the frame. The bowl on the frame is supported on the springs 6 to oscillate as a free body.

The motor or drive means illustrated is of the electromagnetic type and comprises the core member 12 mounted on the bracket 13 that is adjustably supported on the top of the base 1 by the mounting bolts 14. The core is in the shape of a C and has a coil 15 on each leg thereof. The armature 16 is secured to the underside of the frame 8 and extends over each of the pole faces of the core member 12. By properly mounting the core 12 and the armature 16 relative to the central axis 5 each energy impulse of the motor produces a downward axial pull, causing the springs 6 to flex and move the frame in an inclined arcuate path of movement. When the energy impulse passes the springs permit the frame to raise to its normal position.

By tuning the springs 6 to reciprocate the frame at a frequency of a few cycles more or less than the frequency of the driving energy impulses, the vibratory system will follow in synchronism with the frequency of the energy impulses and the best operation of this reciprocating vibratory device will be obtained.

The cantilever springs 6 are tuned to operate at a specific frequency to provide a predetermined natural period of vibration by selecting these springs in accordance with their size in cross-sectional dimension and their length. When this tuning has been determined for a specific feeder bowl weight by the selection of specific size and length of springs then the chosen springs will always respond for that weight of feeder bowl at the selected frequency. If it is desired to change the frequency of the natural period of vibration of a given set of springs this may be done by varying their length, or by changing the weight of the feeder bowl. The tuning of vibratory reciprocating conveyors is known in the art.

The springs 6 should of course be tuned to within a few cycles of the frequency that the device is to reciprocate. A rectifier such as shown at 18 can be employed to reduce the number of current impulses to that of the frequency which then causes the armature and the parts attached thereto to reciprocate. This rectifier is preferably a grid controlled thyratron.

The magnitude of the current impulses may be controlled by a simple rheostat as shown at 17 in conjunction with the grid controlled thyratron tube. The coil 15, the grid controlled rectifier 18, and rheostat 17 can be connected in series across a source of alternating current.

This feeder bowl is mounted on the frame 20 which also carries the constant speed endless conveyor 21 that is electrically driven by a synchronous motor and is supported on the hanger 22. The endless belt passes over the pulleys 23 and 24 and sides 25 are provided to prevent the material from moving laterally off the belt. The hanger 22 is suspended from the end 26 of the weighing machine 27 which is a balanced dual platform scale. The other platform 28 receives the weight for measuring the amount of tare weight and load to be handled on the constant speed belt conveyor. A poise 29 is provided to balance the scale between units of weight placed on the platform 28.

A magnetic pickup 30 is provided for the control of the bowl feeder. This pickup has the armature 31 mounted on the hanger 22 and when at its balanced position is midway between the pole faces of the electromagnetic pickup coils 32 and 33, which are effective in the circuit shown in Fig. 4 to control the voltage on the operating coil 15 of the feeder bowl motor and thus increase or decrease the voltage thereof to increase or decrease the magnitude of vibration of the bowl and correspondingly the supply of material fed thereby.

Figure 4:
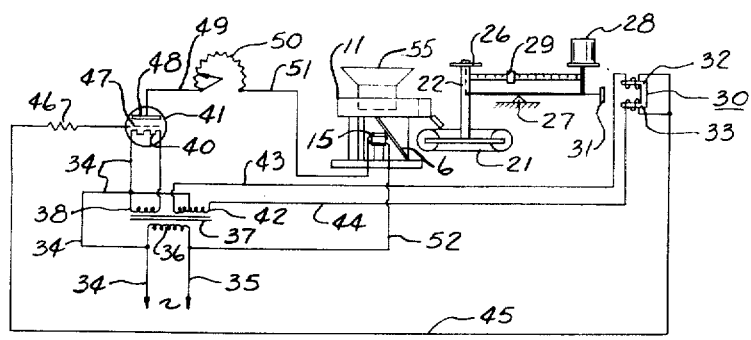
Fig. 4 is a schematic diagram of the control circuit.

As shown in Fig. 4 the alternating current supply leads 34 and 35 are connected from a switch not shown to the primary 36 of the transformer 37, the secondary 38 of which supplies the cathode 40 of the tube 41. The secondary 42 supplies energy for the control and one side of 42 is connected by line 43 to coil 32 and the other side by line 44 to coil 33. Coils 32 and 33 are on one magnetic core and their other ends are connected together by line 45 through the grid resistor 46 to the control grid 47. The center tap of secondary 42 is connected to the common or ground side 34 to one side of the secondary 38 and thus the cathode 40. This provides the control grid voltage. The anode 48 of the tube 41 is connected through the line 49 to the rheostat 50 and the other side of the rheostat is connected by line 51 to one side of the electromagnetic operating or field coil 15 of the bowl feeder motor, the other side of which is connected by line 52 to the supply line 35.

Figure 2:
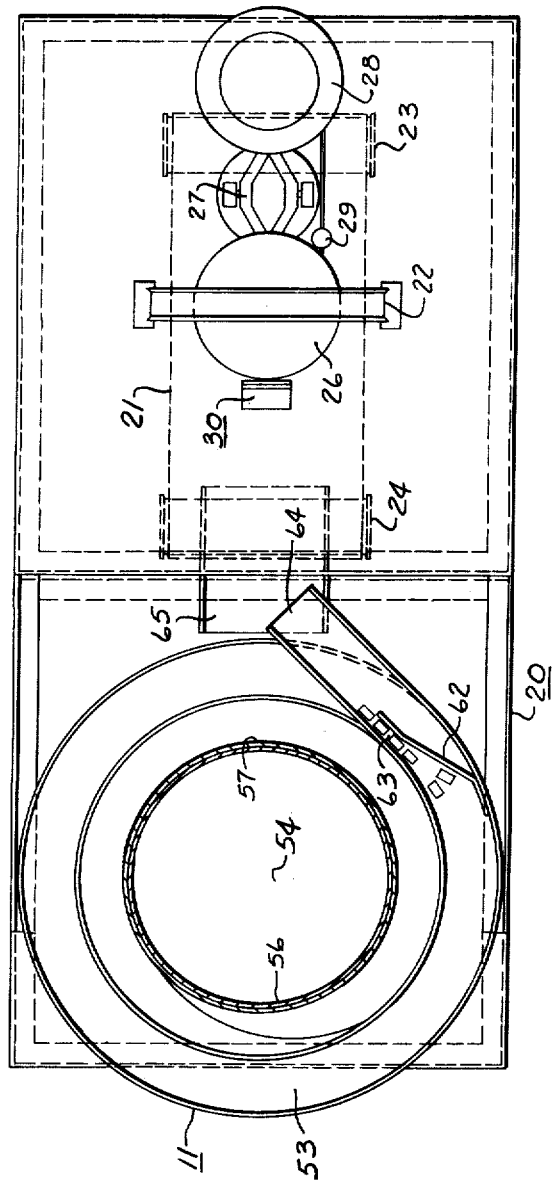
Fig. 2 is a view in horizontal section taken on the line 2—2 of Fig. 1.

Referring again to Figs. 1 and 2 the feeder bowl 11 has the inclined track 53. The bottom of the bowl is cone shaped as indicated at 54. The hopper 55 is adjustably suspended above the bowl and has a depending cylindrical chute or spout 56. This spout has an adjustably mounted collar 57. This collar is held by one or more demountable slides 58 mounted on the spout 56 and are retained on guides 59 which are arcuately inclined to permit the collar to be adjusted relative to the conical floor 54 in the bowl. A clamp screw 60 is provided to secure the collar at its adjusted position. A handle 61 is provided to adjust the slide.

Thus the proximity of the collar 57 to the bottom 54 of the bowl determines the flow of material out of the hopper into the bowl. The floor 54 supports the material in the hopper spout and this material must flow in a circular path when the feeder bowl is operating. Thus the material moving within the spout and collar is caused to flow down the conical bottom and fill the bowl to a predetermined depth wherein the pressure by the material in the bowl opposes the flow down the conical bottom and out of the orifice formed by the bottom of the collar above the floor 54. Thus the proximity of the collar to the flow or the orifice formed, the pitch of the conical floor and the flow characteristic of the material determines the supply in the bowl which if it had no track would remain substantially at a constant elevation in the bowl.

The conveyor track means or track 53 being large fills up with material which flows upwardly around the track until it reaches abutment ejector or wiper means 62 which extends out over the surface of the track and thus materially reduces the volume that can pass this restricted section or orifice 63 of the track.

The operation of a vibratory feeder in moving material upwardly around a helical conveyor path is induced by the reciprocation of the conveyor track in an inclined arcuate path of movement. The direction of the movement of the material is determined by the slope of the cantilever springs supporting the track. The track is drawn downwardly by an energy impulse which flexes the springs, during which time the material remains on the track. When the energy impulse releases the track, the springs force it upwardly along the inclined path of movement, causing it to travel beyond the point of rest. This upward action literally tosses the material upwardly off the surface of the track in the direction along the spiral in which the material is to travel.

Owing to the fact that the vibrated material has a definite angle of vibrated angle of repose the volume passing the restriction 63 is always constant because more material than can pass this point is constantly supplied thereto and the excess merely falls back into the bowl where it is again circulated and refed.

Thus the constant volume supplied to the track end 64 and the chute 65 to the constant speed belt 21 is substantially a constant weight. This cannot be duplicated by a straight feeder.

Figure 3:
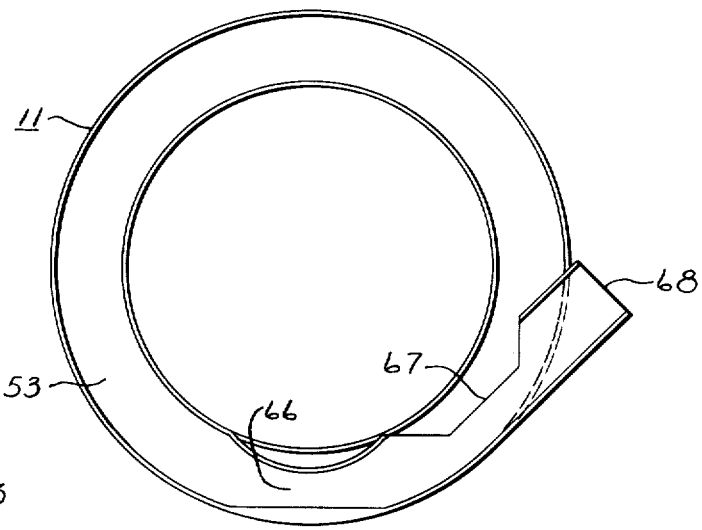
Fig. 3 is a plan view of a bulk material bowl feeder for illustrating a modification of this invention.

As shown in Fig. 3 the track 53 has a restricted zone 66 causing the material to pile high. This is likened unto a race or gorge. The end of this zone opens onto a restricted track 67 wherein the inner portion of the track is cut away thus making a narrow ledge and then proceeds to the track end 68. The restricted zone 66 piles the material high so that when it spills out on to the narrow track the material will easily reach its vibratory angle of repose and thus provide a constant volume flow past this narrow track section.

I claim:

1. A volumetric feeder comprising an upwardly open unitary feeder bowl supported by inclined resilient means to reciprocate as a free body in an inclined arcuate path of movement when energized by intermittently spaced energy impulses, drive means to supply intermittently spaced energy impulses to said feeder bowl to reciprocate the same in said inclined arcuate path of movement, conveyor track means supported by the feeder bowl and extending from the bottom of the feeder bowl to a discharge for conveying material therefrom, a hopper mounted above the feeder bowl to deliver material thereto, said hopper having a discharge opening within the feeder bowl and below the rim of the same to co-operate with the reciprocation of the feeder bowl in its inclined arcuate path of movement to control the volume of the material delivered.

2. The structure of claim 1 characterized in that said hopper discharge includes a sleeve surrounding the opening and adjustable toward and away from the bottom of the bowl to co-operate with the bottom of the feeder bowl to regulate and stop the flow of material into the bowl.

3. The structure of claim 1 which also includes a wiper means mounted on the feeder bowl and extending over the conveyor track means to control the volume of the material turned back into the bowl and the volume discharged.

4. The structure of claim 3 characterized in that said wiper means has an orifice through which the material flows and the excess ejects back into the feeder bowl.

5. The structure of claim 1 which also includes energy impulse control means to regulate the intensity of the energy impulses operating the bowl feeder to control the volume of material delivered thereby.

6. The structure of claim 1 which also includes a constant speed weigh feeder to receive the material discharged from the feeder bowl and a pickup control actuated by said weigh feeder to control the operation of said feeder bowl.

7. A volumetric feeder comprising an upwardly open unitary feeder bowl having bottom and side walls and supported by inclined resilient means for reciprocation as a free body in an inclined arcuate path of movement when energized by drive means to supply intermittently spaced energy impulses to said feeder bowl to reciprocate the same in said inclined arcuate path of movement, intermittently spaced energy impulses, conveyor track means supported by said feeder bowl and extending from the bottom of said feeder bowl to a discharge for conveying material therefrom, a hopper having a discharge mounted within the feeder bowl with its open mouth spaced from and opposite to the bottom of said feeder bowl to be effective in agitating the material in the hopper inducing its flow to the feeder bowl.

8. A constant volume feeder comprising a unitary feeder bowl mounted on inclined resilient means to reciprocate as a free body in an inclined arcuate path of movement, a material supply to maintain material at a predetermined elevation in the bowl capable of constantly filling the track, an inclined track on the inside of the bowl extending to a point of discharge from the bowl, a track restriction to reduce the capacity of material flow in the track at a point above the level of the material before the point of discharge, the excess material being returned to the bowl.

9. A constant volume feeder comprising a unitary feeder bowl mounted on inclined resilient means to reciprocate as a free body in an inclined arcuate path of movement, a supply chute having its mouth adjustably positioned within and above the floor of the feeder bowl to permit the material to flow into the bowl to a predetermined level, an inclined track on the inside of the bowl extending to a point of discharge from the bowl, a restriction to reduce the capacity of the material flow in the track at a point above the level of the material before the point of discharge, the excess material being returned to the bowl.

10. A constant volume feeder comprising a unitary feeder bowl mounted on inclined resilient means to reciprocate as a free body in an inclined arcuate path of movement, a supply chute having its mouth positioned within and above the floor of the feeder bowl, an adjustable collar on the mouth of said chute and adjustable relative to the floor of the bowl to permit the material to flow into the bowl to a predetermined level, an inclined track on the inside of the bowl extending to a point of discharge from the bowl, a restriction to reduce the capacity of the material flow in the track at a point above the level of the material before the point of discharge, the excess material being returned to the bowl.

11. The structure of claim 10 which also includes a conical surface on the feeder bowl floor to coact with the chute in controlling the feeding of the material into the bowl.

References Cited in the file of this patent

UNITED STATES PATENTS

| 2,100,315 | Harper | Nov. 30, 1937 |
| 2,366,415 | Lindsay | Jan. 2, 1945 |
| 2,618,406 | Kast | Nov. 18, 1952 |
| 2,662,192 | Weyandt | Dec. 8, 1953 |
| 2,696,292 | Spurlin | Dec. 7, 1954 |

FOREIGN PATENTS

| 279,119 | Great Britain | Oct. 15, 1927 |

UNITED STATES PATENT OFFICE
CERTIFICATE OF CORRECTION

Patent No. 2,804,992

September 3, 1957

William F. Peters

It is hereby certified that error appears in the printed specification of the above numbered patent requiring correction and that the said Letters Patent should read as corrected below.

Column 5, lines 30 and 31, strike out "intermittently spaced energy impulses," and insert the same after "by" in line 28, same column.

Signed and sealed this 12th day of November 1957.

(SEAL)
Attest:
KARL H. AXLINE
Attesting Officer

ROBERT C. WATSON
Commissioner of Patents